Sept. 24, 1957     H. K. BIGELOW     2,807,306
MACHINE FOR LINING A BRAKE SHOE
Filed March 16, 1953     2 Sheets-Sheet 1
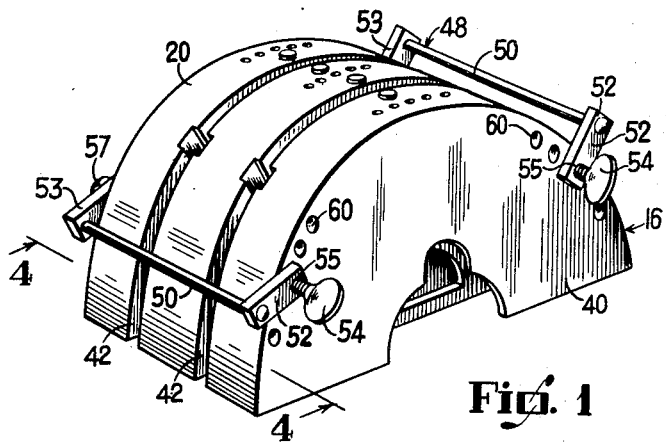
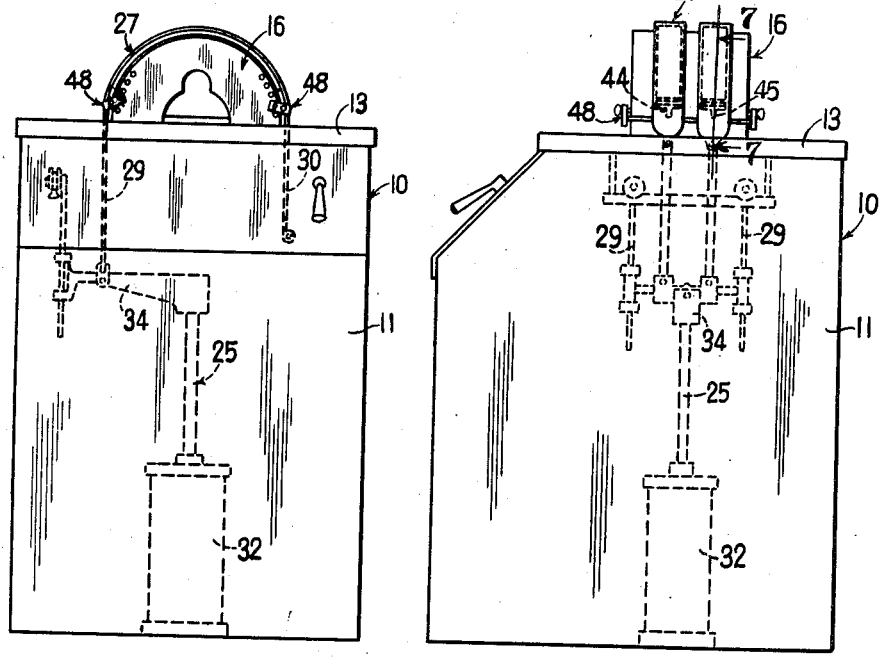
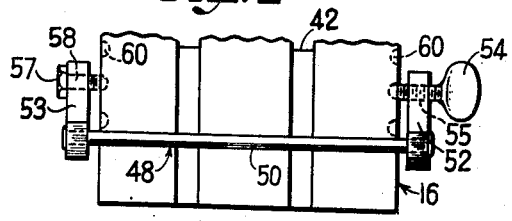
INVENTOR.
Harry K. Bigelow
BY
Warren H. F. Schmieding
ATTORNEY Sept. 24, 1957 H. K. BIGELOW 2,807,306
MACHINE FOR LINING A BRAKE SHOE
Filed March 16, 1953 2 Sheets-Sheet 2
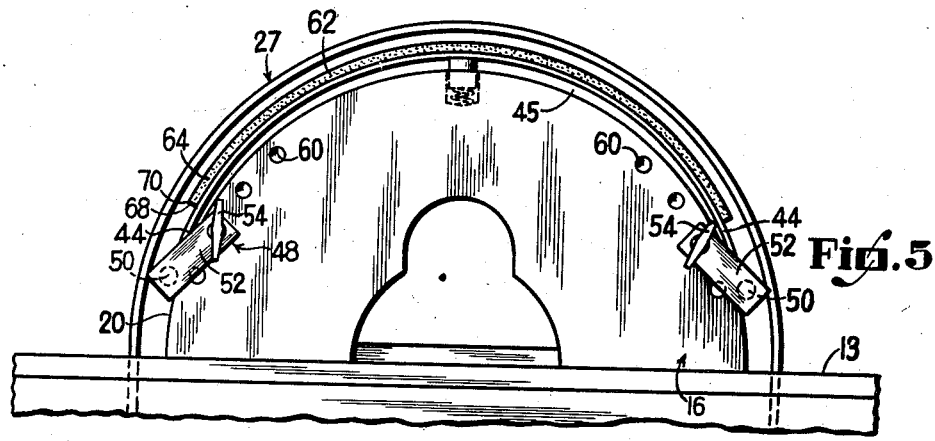
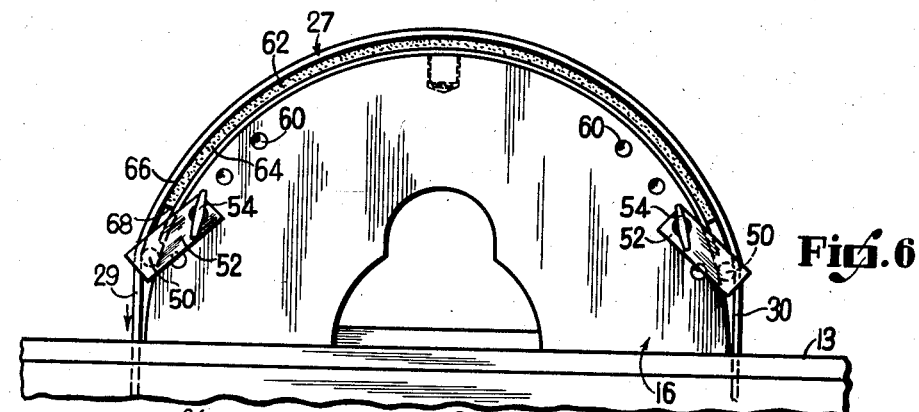
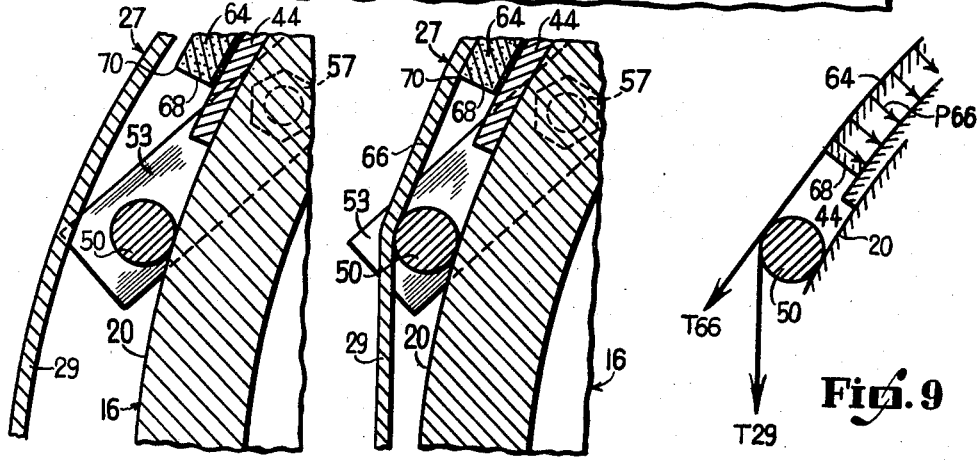
INVENTOR.
Harry K. Bigelow
BY
Warren H. T. Schmieding
ATTORNEY

United States Patent Office 2,807,306
Patented Sept. 24, 1957

2,807,306
MACHINE FOR LINING A BRAKE SHOE

Harry K. Bigelow, Columbus, Ohio

Application March 16, 1953, Serial No. 342,368

2 Claims. (Cl. 154—1)

This invention relates generally to machines for lining brake shoes, and more particularly to improvements in machines with which a brake liner is secured to a brake shoe by bonding. Machines of the present type include a platen or anvil for supporting the assembled brake shoe and liner, a burner for heating the platen, where heat is to be used in the bonding process, and means for applying pressure to the brake shoe and liner during the bonding operation.

It is an object of the invention to provide a machine of the characters stated, which is adapted to apply pressure uniformly over the entire arcuate surface of a brake shoe liner during the bonding of such liner to a brake shoe.

Another object of the present invention is to provide an improved bonding machine wherein the end edges of a brake liner, which is being bonded to a shoe, are not damaged by the pressure applying means during the bonding operation.

Still another object of the present invention is to provide an improved machine of the type described wherein an improved bond is obtained, between the liner and the brake shoe, particularly at the portions of the bonded surfaces lying adjacent to each end of the brake liner being bonded.

A further object of the invention resides in an improved apparatus, for achieving the foregoing objects, which apparatus is readily adjustable for accommodating various sizes of brake shoes and liners.

Further objects and advantages of the present invention will be apparent from the following description, reference being had to the accompanying drawings, wherein a preferred form of embodiment of the invention as clearly shown.

In the drawing:

Fig. 1 is a perspective view of the platen element of the present machine showing the present invention embodied therein.

Fig. 2 is a front elevational view of a brake lining machine showing the platen of Fig. 1 embodied therewith.

Fig. 3 is a side elevational view of the machine of Fig. 2.

Fig. 4 is a partial side elevational view of the platen of Fig. 1, with the view being taken along the line 4—4 of Fig. 1.

Fig. 5 is a partial front elevational view of the machine of Fig. 2, showing straps for applying pressure to a liner and a brake shoe, with such straps being in a raised position away from engagement with the brake liner, and before pressure is applied to the liner by the straps.

Fig. 6 is a view corresponding to Fig. 5 wherein the straps are in a pressure applying position.

Fig. 7 is a partial sectional view with the section being taken along the line 7—7 of Fig. 3. This figure is an enlarged view of a spacer member of the present invention in place on the platen.

Fig. 8 is a view corresponding to Fig. 7 wherein the strap is shown in the pressure applying position.

Fig. 9 is a schematic force diagram, corresponding to Fig. 8, showing the effects of the present invention on the direction of tension in the strap when such strap is in the pressure applying position of Figs. 6 and 8.

Referring further to the drawings, a complete machine for bonding liners to brake shoes is indicated generally at 10 in Figs. 2 and 3. Such machine comprises a cabinet 11 which is provided with a top plate 13 serving to support a platen, or anvil indicated generally at 16.

The platen 16, which is shown isolated from the other portions of the machine in Fig. 1, is formed with an arcuately shaped top surface 20 for receiving a pair of brake shoes thereon.

Referring again to Figs. 2 and 3, an apparatus for applying pressure to the platen, shoe, and liner is indicated generally at 25. Such mechanism comprises a plurality of flat, flexible straps 27 which are normally disposed arcuately above surface 20 of the platen 16. These straps are preferably formed of a resilient metal. Each strap 27 is provided with downwardly extending ends 29 and 30 which ends extend through the top plate 13 to engage suitable actuating mechanism confined within the cabinet 10. A suitable actuating mechanism is shown in Figs. 2 and 3 which mechanism includes a pneumatic cylinder 32. Pneumatic cylinder 32 is secured to the base of the cabinet 10 and is operatively connected to the ends of straps 27 through suitable linkage indicated generally at 34. The linkage 34 may be of the single-tree type such as is disclosed in co-pending applications Serial No. 98,988, filed June 14, 1949. With a single-tree type of linkage, the total force exerted by the pneumatic cylinder 32 will be distributed equally to each of the plurality of straps 27. It should be noted that various other mechanisms can be substituted for the pneumatic cylinder 32 and the single-tree linkage 34 without departing from the spirit of the present invention.

Referring again to Fig. 1, the present platen in structure will be considered in detail. Platen 16 is formed with a side wall 40, a top arcuate surface 20, and a plurality of slots or spaced openings indicated at 42. These slots 42 provide web clearance for the brake shoes when such shoes are being supported on the surface 20. A standard brake shoe 44 is shown positioned on the platen 16 in Figs. 5 through 8 with the web 45 extending downwardly into a slot 42 of the platen.

Referring again to Fig. 1, a pair of spacer members are shown attached to the platen 16, with each of such spacer members being indicated generally at 48. Each spacer member comprises a transverse rod 50 having a bracket 52 secured to one end thereof and a second bracket 53 secured to the other end thereof. One of the brackets 52 is provided with a thumb screw 54, which screw is carried in a threaded hole 55; the other bracket 53 carries a machine screw 57 in a threaded hole 58. To secure the spacer member to the platen, a plurality of spaced arcuately disposed holes 60 are formed in each of the opposite side walls 40 of the platen 16, as best seen in Figs. 1 and 4.

Reference is now made to Figs. 5 through 9, wherein the function of the spacer members 48 is clearly illustrated.

Fig. 5 shows the strap 27 in the raised position and before it has been pulled downwardly by the mechanism 25 to the point where the strap will contact the liner 62, which liner is assembled on the brake shoe 44. A suitable bonding agent is utilized between the brake shoe and the liner. A suitable bonding agent consists of a thermosetting resin which flows under the application of heat and pressure, or pressure alone where a cold setting resin is used to effect the bonding action between the shoe and liner. It will be noted that the spacer members 48 are mounted on the platen 16, at either end of the brake shoe 44. The brackets 52 and 53 extend downwardly and rods 50 are in contact with the top arcuate surface 20 of the platen 16. The thumb screws 54 and machine screws 57 are selectively positioned in the hole 60 so that the spacer members 48 will be properly mounted adjacent to the ends of the particular size of brake shoe 44 which is to be bonded.

Referring next to Fig. 6, the same structural components of Fig. 5 are again shown, but the strap 27 has been drawn downwardly to the pressure applying position by actuation of the pneumatic cylinder 32 and the linkage 34 as previously described; as is shown in Fig. 6, the strap 27 will then be in contact with the liner 62 throughout the arcuate length of the liner. At each end 64, of the liner 62, strap portions 66 contact such liner ends 64, with each strap portion 66 extending from an edge 68 of the liner to one of the rods 50, and then downwardly, in a straight line, to the actuating mechanism.

With the spacer member 48, in the configuration shown in Figs. 5 and 6, rod 50 serves as a bridge, or spacer, for the straps, thereby maintaining the end portion 66, spaced away from the surface 20 of the platen 16. In this manner edge corners 70, at each end of the liner 62, are protected from rupture and rounding, which rupture and rounding could occur if the strap 27 were pulled directly downwardly against the edge corners 70.

An edge corner 70, of the liner 62, is best seen in Figs. 7 and 8 wherein the strap 27 is shown in release position, and the pressure applying position, respectively.

Reference is next made to Fig. 9, which is a diagrammatic view showing the directions of tension in the strap portion 66 and a pressure distribution diagram of the strap pressure on end portion 64 of the liner 62, which liner is under pressure during the bonding operation. In Fig. 9 it will be clearly seen that when the spacer rod 50 is in place on the platen surface 20, the direction of tension in the strap portions 66, and particularly the direction of tension at the edge 68 of the liner, is in a direction substantially tangential to the arcuate upper surface of the liner. Such tangentially directed tension is represented by a vector T-66, in Figure 9, which vector represents the direction of tension in the strap portion 66 at the edge 68 of the liner. With further reference to Fig. 9, the direction of tension in the downwardly directed end portion 29 of the strap is indicated by the vector T-29. Hence, it will be seen that an abrupt change in the direction of tension occurs where the strap passes over the spacer rod number 50. It will therefore be understood that the direction of tension in a strap portion 66, which portion contacts the end edge 64 of the liner, will be maintained substantially tangential, in direction, to the arc of the upper surface of the liner 62, independently of the direction of tension in the downwardly extending strap portion 29.

As of the result of the controlled direction of tension in the strap portion 66, the distribution of pressure, applied to the end of the lining 64 by the strap portion 66, will be substantially constant along the arcuate length of the end portion 64 of the liner 62. Such constant distribution of pressure is indicated by the pressure distribution diagram of Fig. 9, which consists of the radially directed vectors P-66. The length of each of the vectors P-66 represents the magnitude of the radially directed component of the total pressure applied at the location of such vector. Hence, the vectors serve to diagrammatically illustrate that the pressure along the arcuate end portion 64 is substantially constant. Such substantially constant pressure distribution along the arcuate length of the ends of the liner is a prerequisite to obtaining a uniformly strong bond along the entire length of the contacting surfaces of the liner and the shoe.

With further reference to Fig. 9, were the spacer member 48 removed from the machine, and if a bonding operation were conducted without the benefit of such member, the illustrated constant pressure distribution diagram, consisting of vectors P-66, would no longer illustrate a true picture of the pressure distribution. Instead, high points of pressure would develop at the end edge 68 of the liner, and a pressure gradient would result along the arcuate length of the end portion 64 of the liner. As a result, the edge corner 70 of the liner would be rounded or broken, and, moreover, the bond between the end portions 64, of the liner, and the shoe would be non-uniform and unsatisfactory.

Hence, it is seen from the foregoing that the present invention provides a meritorious advancement in the art by producing a uniform bond, between a brake lining and a brake shoe, throughout the entire arcuate length of the liner, including the end portions of the liner. In addition, the end edge corners of the liner are protected from rupture and rounding.

While the form of embodiment of the present invention as herein disclosed constitutes a preferred form, it is to be understood that other forms might be adopted, all coming within the scope of the claims which follow.

I claim:

1. A machine for lining a brake shoe comprising in combination an arcuately shaped platen element adapted to receive, on its outer periphery, an arcuately shaped brake shoe carrying a liner to be attached to the shoe, flexible element having an inner surface confronting and normally spaced from its outer periphery of the platen, said flexible element having a central portion engageable with the outer surface of a liner and having portions extending beyond the ends of the liner, means for imparting relative movement between said elements, and spacer means engaging the flexible element and supported by the periphery of said platen, said spacer means consisting of a U-shaped member including a horizontal spacer member supported by the periphery of said platen and engaging said inner surface of said flexible element, said U-shaped member further including spaced leg members connected to said spacer member and disposed along the sides of said platen, and fastening means carried by the leg members and connected to said platen for adjustably mounting the U-shaped member to the platen, said spacer element being positioned adjacent the end of said liner whereby said flexible element extends in one direction from a location of supported contact with said spacer means to said movement-imparting means, and in the other direction from said location of supported contact over the upper surface of said liner, said spacer means serving to locate said flexible element at a predetermined distance from said platen element.

2. A machine for lining a brake shoe, comprising in combination, an arcuately shaped platen element adapted to receive, on its outer periphery, an arcuately shaped brake shoe carrying a liner to be attached to the shoe, an arcuately arranged flexible strap, a portion of the inner surface of the strap confronting and normally spaced from the outer periphery of the platen, said strap having portions extending substantially downwardly, means connected with said extended portions for imparting relative movement between the strap and the platen, and spacer means engaging the flexible element and supported by the periphery of said platen, said spacer means consisting of a U-shaped member including a horizontal spacer member supported by the periphery of said platen and engaging said inner surface of said flexible element, said U-shaped member further including spaced leg members connected to said spacer member and disposed along the sides of said platen, and fastening means carried by the leg members and connected to said platen for adjustably mounting the U-shaped member to the platen, said spacer element being positioned adjacent the end of said liner whereby said flexible element extends in one direction from a location of supported contact with said spacer means to said movement-imparting means and in the other direction from said location of supported contact over the upper surface of said liner, said spacer means serving to locate said flexible element at a predetermined distance from said platen element for directionally controlling the tension in the strap at portions of the strap engageable with the ends of the liner.

References Cited in the file of this patent

UNITED STATES PATENTS

| | | |
|---|---|---|
| 2,443,693 | Paulsen | June 22, 1948 |
| 2,517,701 | Oettinger | Aug. 8, 1950 |
| 2,569,737 | Spanich | Oct. 2, 1951 |
| 2,598,363 | Davis | May 27, 1952 |
| 2,642,919 | Kingman | June 23, 1953 |
| 2,655,974 | Heintz | Oct. 20, 1953 |
| 2,726,974 | Lupton et al. | Dec. 13, 1955 |